Nov. 1, 1932.  E. F. ZAPARKA  1,886,143
AUTOMATIC TAKE-UP BUSHING
Filed Dec. 11, 1928  2 Sheets-Sheet 1
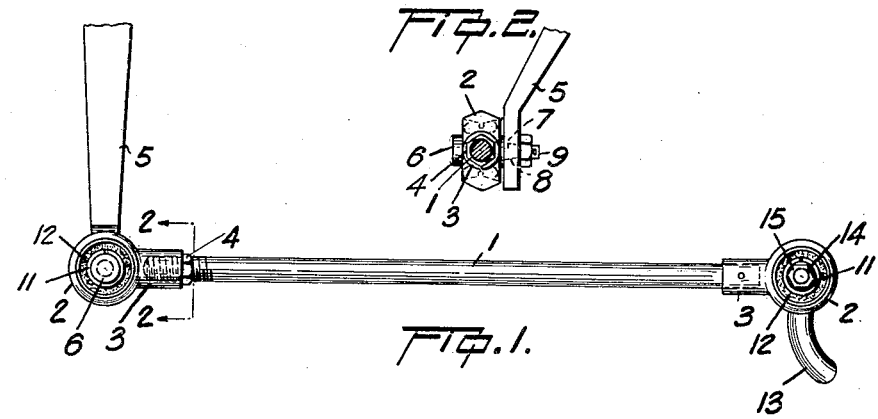
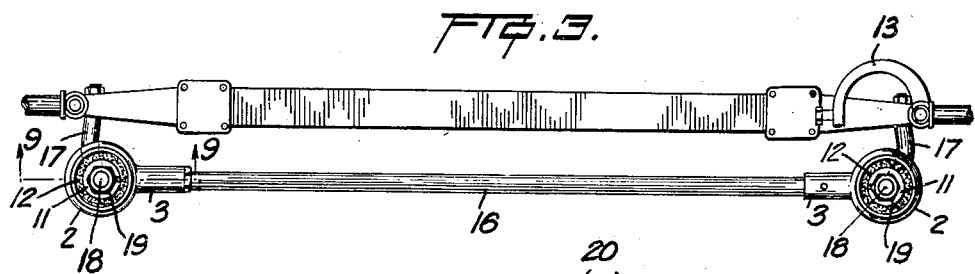
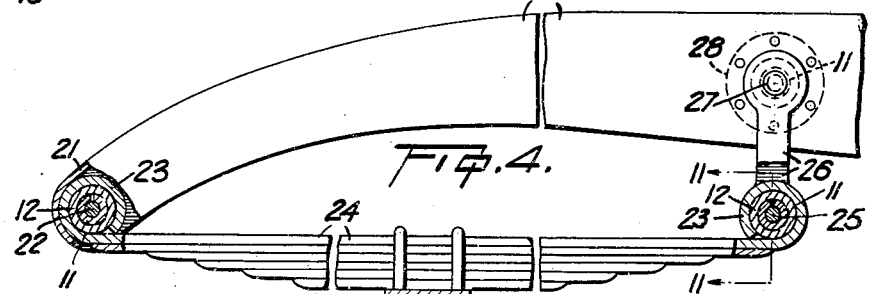
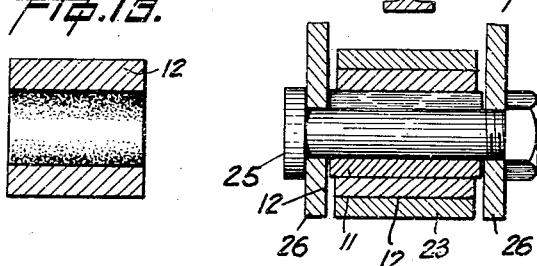
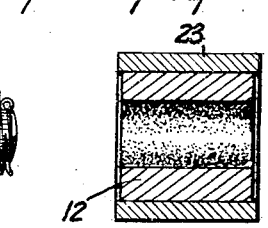
INVENTOR.
Edward F. Zaparka
BY
ATTORNEY.

Nov. 1, 1932.  E. F. ZAPARKA  1,886,143
AUTOMATIC TAKE-UP BUSHING
Filed Dec. 11, 1928  2 Sheets-Sheet 2
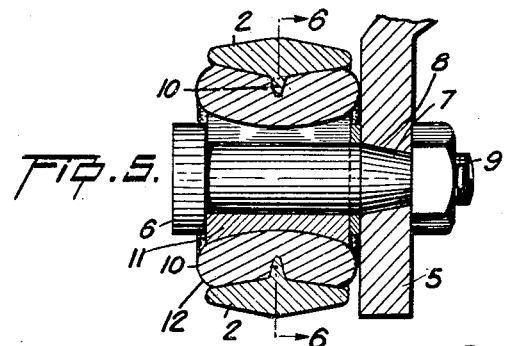
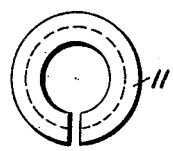
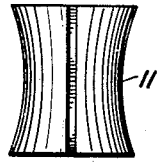
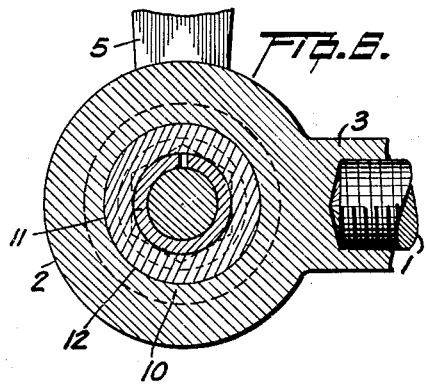
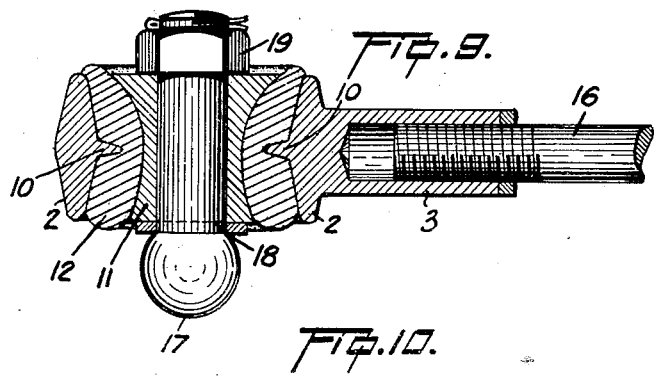
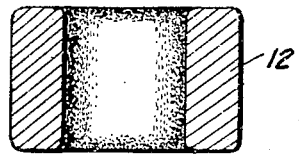
INVENTOR.
Edward F. Zaparka
BY
ATTORNEY Patented Nov. 1, 1932

1,886,143

UNITED STATES PATENT OFFICE

EDWARD F. ZAPARKA, OF NEW YORK, N. Y.

AUTOMATIC TAKE-UP BUSHING

Application filed December 11, 1928. Serial No. 325,265.

My invention relates to improvements in automatic take-up bushings and the object of the invention is to devise a bushing which, in addition to compensating itself to the wear of the spindle, shaft or bolt extending therethrough, will permit of angular displacement of such spindle, shaft or bolt from its normal axial line or, alternatively, axial displacement of the bushing itself relatively to its normal position with respect to the spindle, shaft or bolt.

A further object is to construct a bushing which will have a very long life without the necessity of any attention being paid to it, and which will be simple in construction as well as comparatively inexpensive to manufacture.

A still further object is to construct a bushing which when used in joints, knuckles and the like in which one or more parts move relatively to other parts, will obviate squeaking or other objectionable noise.

While my bushing is susceptible to many greatly diversified uses, it has a particularly adaptable application to certain parts of an automobile such as the joints between the steering arm or drag link arm and the drag link, replacing the orthodox ball joints, between the knuckle steering arms and the tie bar ends, or in the spring suspension system between the spring end and the spring horn bolts, as well as in the spring shackles.

My invention consists, in preferred form, of a split sleeve or bushing of any suitable material through which the spindle, shaft or bolt freely extends, said bushing being surrounded by an element in bushing form constructed of any suitable resilient material, such as rubber, such resilient bushing being surrounded in turn by a suitable rigid housing supported in any suitable way or connected to any required element depending upon to what use the bushing is to be put, the resilient bushing being compressed when in position between the housing and the split bushing so as to exert an inward pressure on the latter to cause an automatic take-up effect.

In the drawings, which illustrate the preferred embodiment of my invention:

Fig. 1 represents a side elevation of a front axle steering reach rod or drag link, steering arm and drag link arm, showing by bushing mounted on each end of the drag link and connected respectively to the steering arm and drag link arm so as to give a universal joint action.

Fig. 2 is a vertical cross section taken through the line 2—2 Figure 1.

Fig. 3 is a plan view of a typical automobile front axle showing the knuckle steering arms and tie bar with my bushing mounted on each end of the latter and constituting a joint between the ends of the tie bar and such knuckle steering arms.

Fig. 4 is a side elevation (partly in section) of the front portion of a side member of a chassis frame showing the spring horn, spring and shackle with my bushing applied between the front end of the spring and the spring horn bolt, as well as between the rear end of the spring and the shackle, and also between the shackle supporting bolt and the shackle.

Fig. 5 is an enlarged vertical cross section through the steering arm connected to the worm sector of a steering gear, showing my bushing in section applied thereto, such bushing being of the form illustrated in Figures 1 and 2 of the drawings.

Fig. 6 is a vertical section through the line 6—6 Figure 5.

Fig. 7 is an elevational view of the split inner bushing drawn to the same scale as is illustrated in Figures 5 and 6.

Fig. 8 is an end view thereof.

Fig. 9 is an enlarged sectional view through the line 9—9, Figure 3.

Fig. 10 is a sectional elevation of the resilient bushing adapted to surround the split bushing, said resilient bushing as depicted, being in the form it assumes prior to being introduced between the split inner bushing and the housing.

Fig. 11 is a sectional view taken through the line 11—11 Figure 4, showing the shackle bolt and spring end and the particular form of my bushing used in conjunction therewith.

Fig. 12 is a similar view of the spring end showing the resilient bushing in place prior to inserting the inner split bushing into the assembly, and

Fig. 13 is a sectional detail of the resilient bushing applicable to the spring ends illustrated in Figure 4, showing the initial form it assumes prior to being introduced into such spring ends.

Like characters of reference indicate corresponding parts in the different views.

I will first describe the construction of the preferred form of bushing which I use in connection with the drag link illustrated in Figures 1 and 2, which bushing is illustrated in detail in Figures 5, 6, 7, 8 and 10 of the drawings. 1 is the drag link provided at each end with the annular housings 2, upon each of which is preferably formed the radially extending socket 3, by means of which said housings 2 are secured to the ends of the drag link 1. As illustrated, the socket 3 is internally threaded and adapted to receive the threaded end of the drag link 1, such socket 3 being held in its adjusted position on the end of the drag link by means of the locknut 4.

The steering arm 5, which is connected to the worm sector of the steering gear (not shown), may carry on its lower end the horizontally protruding headed bolt 6 which may, if desired, include a tapering portion 7 adapted to be received in a correspondingly tapered orifice 8 in the lower end of the steering arm 5. A nut 9 is threaded onto the end of the bolt 6 for holding the same in place on such steering arm 5.

The inner surface of the annular housing 2 is provided with an inwardly protruding central rib 10 extending around the same and the faces of the inner surface are bevelled from the rib to the side edges of the housing so that the inner periphery of such housing assumes a substantially cambered surface.

Freely mounted on the bolt 6 is a split bushing 11, the outer periphery of which is concave in cross section; said bushing 11 may consist of any suitable material such as metal, or it may be made of a self lubricating material such as lignum-vitæ impregnated with oil or any other self lubricating or anti-friction material.

12 is a bushing of resilient material adapted to be inserted into the space between the inner surface of the housing 2 and the concave periphery of the bushing 11, said resilient bushing being composed of any suitable material such as rubber, and assuming initially substantially the form illustrated in Figure 10 of the drawings.

The construction of bushing applied to the drag link arm 13 (Figure 1) is identical to that described as constituting the joint between the steering arm 5 and the other end of the drag link 1. In place of the bolt 6, a bolt or spindle 14, secured to or forming part of the drag link arm, extends freely through the bushing 11, being provided with the nut 15 (Figure 1) threaded onto its free end.

It will be observed that the bushings provided on the ends of the drak link 1 are preferably disposed in a horizontal position, as illustrated in Figures 1 and 2. The contrary is the case where my bushings are used on the ends of the tie bar 16 (Figure 3) where such bushings are preferably disposed vertically. Otherwise the construction of bushing is identical to that described above, with the exception that the ends of the knuckle steering arms 17 are provided with upwardly extending bolts or spindles 18 upon the free ends of which are threaded the nuts 19 for rotatably securing the bushing 11 in place, as is clearly illustrated in Figure 9 of the drawings.

In order to avoid the possibility of the housing 2 on the ends of the tie bar 16 becoming disengaged from the bolts 18 upon disintegration of the resilient bushing 12, one end of the bushing 11 may be of greater diameter than the internal diameter of the rib 10. Thus such housing will be prevented from being displaced as the rib would engage the larger end of such bushing. The same construction may be used where my bushing is applied to either the steering arm 5 or the knuckle steering arm 13.

Where my bushing is used in the spring ends and shackle connections it may be constructed of slightly different form to that described above, but to all intents and purposes is identical. In such use there is no necessity to construct the bushing 11 with a concave outer periphery and it would be preferably of cylindrical shape, but split in the same manner as the bushing with the concaved outer surface.

Referring specifically to Figures 4, 11, 12 and 13 of the drawings in which my bushing is shown as applied to vehicle spring suspensions, 20 is a side member of a chassis frame and 21 the spring horn, 22 being the transverse bolt extending through the horn. The split bushing 11 extends freely around the bolt 22 and is surrounded in turn by the resilient bushing 12, both bushings being inserted into one circular spring end 23 of the spring 24. In this instance the spring ends 23 would, of course, have to be of larger diameter than is normally the case. The bushing applied to the other spring end 23 is identical in construction, the shackle bolt 25 extending freely through the interior of the bushing 11 and through the shackle plates 26. Furthermore, an identical bushing to the ones applied to the spring ends would be mounted on the shackle support bolt 27 which extends through the shackle support 28.

In applying my bushings to either the housings 2 or the spring ends 23 or the shackle support 28 it will not usually suffice to merely insert a resilient bushing 12 of the same external diameter as the internal diameter of the housing into such housing and to then insert the split bushing 11. It is necessary that the material of the resilient bushing 12 be under the required compression when the assemblies are complete so that such resilient bushing 12, having a tendency to expand, will contract the split bushing 11 into engagement with the bolt which extends therethrough and, as such bolt becomes worn, the bushing 12 will further expand so as to continue to close the split bushing 11 about its bolt. In addition, resilient material such as rubber under compression has a much greater life than when not compressed. Consequently the bushing will automatically take up for any wear upon the bolt or interior of the bushing 11 so that there will be a snug fit at all times.

In order to compress the resilient bushing 12 its exterior diameter may conceivably be the same as the internal diameter of the housing 2 or the spring ends 24, or the shackle support 28, in which case it could be merely inserted into any one of these parts, and the bushing 11, which would be of greater diameter than the interior diameter of the bushing 12, could then be inserted. A further compression could be obtained by making the bolt inserted through the spindle oversize so that it would expand the internal bushing the requisite extent.

However, I preferably construct by bushing 12 of larger external diameter than the interior of the housing 2, spring ends 23 or shackle support 28, as is illustrated in Figures 10 and 13, and then force such resilient bushing into one of these parts with the result that the diameter is reduced and the bushing put under a certain amount of compression which is increased by forcing into the interior of the bushing again an oversize bushing 11.

The rib 10 and the concaved outer periphery of the bushing 11, as well as the cambered interior periphery of the housing 2 are provided for the purpose of preventing any liability of displacement of the resilient bushing 12, where such bushing is applied to the ends of the drag links or tie bars. It is not necessary to so construct the bushing 11 or the resilient bushing 12 in the case where such bushing is used in the spring ends 23 or in the shackle support 28, as the spring horns and the shackles prevent any liability of the bushings becoming displaced.

It will be observed that a bushing constructed according to my invention will be exceedingly flexible giving a universal joint action, as is the case where such bushing is used on the ends of drag links and tie bars. The same applies in a less marked degree to the case where my bushing is applied to spring ends or shackles, as owing to the unevenness of road surfaces and bumps there are twisting stresses on the springs, which tend to put excessive wear upon the bolts. This is avoided by the use of my bushings which will permit the axis of the spring ends to be displaced relatively to the bolts extending therethrough without putting any wear upon the latter.

Even if the bolts do wear the equivalent expanding of the resilient bushings 12 will automatically cause the split bushings 11 to close or take up so that they are kept in engagement with the bolts.

As many modifications may be made in my invention without departing from the spirit of the same or the scope of the claim the form of bushing shown and described is to be taken in an illustrative and not in a limiting sense.

In some cases my bushing may be used without the necessity of it being so constructed that it has an automatic take-up effect. In such instances the inner bushing 11 can be made solid instead of split, the complete assembly then only being capable of acting as a flexible joint without any take-up qualities.

What I claim as my invention is:

An automatic take-up bushing comprising, in combination, an annular outer housing, a longitudinally split bushing adapted to be rotatably secured on a central spindle and having a concave peripheral surface, one end of which is of greater diameter than the internal diameter of the housing, and a resilient bushing interposed under compression between the concave peripheral surface of the split bushing and the housing.

EDWARD F. ZAPARKA.